US012681360B2

(12) United States Patent　　　　(10) Patent No.:　　US 12,681,360 B2

Lin et al.　　　　　　　　　　　　　(45) Date of Patent:　　　　Jul. 14, 2026

(54) LIQUID CRYSTAL CAMERA APERTURE

(71) Applicant: Dell Products L.P., Round Rock, TX (US)

(72) Inventors: Yi-Hsien Lin, Taipei City (TW); Ghee Beng Ooi, Singapore (SG); Chih-Hao Kao, Singapore (SG)

(73) Assignee: Dell Products L.P., Round Rock, TX (US)

( * ) Notice: Subject to any disclaimer, the term of this patent is extended or adjusted under 35 U.S.C. 154(b) by 30 days.

(21) Appl. No.: 18/892,921

(22) Filed: Sep. 23, 2024

(65) Prior Publication Data

US 2026/0086427 A1　　Mar. 26, 2026

(51) Int. Cl.
　　G03B 9/02　　　(2021.01)
　　G03B 9/08　　　(2021.01)
　　H04N 23/75　　(2023.01)

(52) U.S. Cl.
　　CPC ................. G03B 9/02 (2013.01); G03B 9/08 (2013.01); H04N 23/75 (2023.01)

(58) Field of Classification Search
　　CPC ............. G03B 9/02; G03B 9/08; H04N 23/75
　　See application file for complete search history.

(56) References Cited

U.S. PATENT DOCUMENTS

| | | | |
|---|---|---|---|
| 3,890,628 A | 6/1975 | Gurtler | |
| 4,039,254 A * | 8/1977 | Harsch | G02F 1/13471 |
| | | | 2/8.8 |
| 5,150,234 A * | 9/1992 | Takahashi | G02F 1/29 |
| | | | 349/1 |
| 5,893,622 A * | 4/1999 | Gold | G02F 1/134309 |
| | | | 349/96 |
| 9,389,454 B2 | 7/2016 | Yamaguchi et al. | |
| 10,012,884 B2 | 7/2018 | Osterman et al. | |
| 10,866,461 B2 | 12/2020 | Nakamura et al. | |
| 2003/0210377 A1 * | 11/2003 | Blum | G02F 1/133553 |
| | | | 351/159.4 |
| 2007/0242201 A1 * | 10/2007 | Hyatt | G03B 9/02 |
| | | | 349/123 |

(Continued)

FOREIGN PATENT DOCUMENTS

WO　　WO-2024011209 A2 *　　1/2024　　............... G03B 9/08

OTHER PUBLICATIONS

Kim, Y. and Chun, K., "Tunable Aperture with Liquid Crystal for Real-Time Distance Sensor," Semantic Scholar, downloaded from https://www.semanticscholar.org/paper/Tunable-Aperture-With-Liquid-Crystal-for-Real-Time-Kim-Chun/ccb96b5bbc7408446dd67b7249f976fb89e648e6 on Sep. 23, 2024, 5 pages.

*Primary Examiner* — Timothy J Henn
(74) *Attorney, Agent, or Firm* — Zagorin Cave LLP; Robert W. Holland

(57) ABSTRACT

A camera captures visual images from light passed through a lens aligned with an image sensor and interfaced with an image signal processor. A non-mechanical aperture coupled at the lens adjusts the camera aperture with plural areas selectively blocked from passing light by application of an electric field to a liquid crystal layer. Orthogonal polarizers on the front and rear sides of the liquid crystal layer block passage of light when an electric field is absent and selectively pass light with incremented decrease of the camera aperture as areas of concentric circles from a center out to a perimeter once an electric field is applied.

20 Claims, 7 Drawing Sheets

(56)             References Cited

U.S. PATENT DOCUMENTS

| | | | |
|---|---|---|---|
| 2008/0084498 A1* | 4/2008 | He | G02F 1/13306 |
| | | | 348/363 |
| 2009/0033863 A1* | 2/2009 | Blum | G02C 7/04 |
| | | | 623/6.31 |
| 2009/0279050 A1* | 11/2009 | Mcginn | G02F 1/134309 |
| | | | 351/204 |
| 2016/0238869 A1* | 8/2016 | Osterman | G02F 1/1337 |
| 2020/0209666 A1* | 7/2020 | Akcasu | G02F 1/134309 |
| 2024/0176205 A1* | 5/2024 | Lin | G02F 1/29 |
| 2024/0184183 A1* | 6/2024 | Chiyoda | G02F 1/13312 |
| 2025/0244639 A1* | 7/2025 | Aoki | H04N 23/57 |

* cited by examiner

LIQUID CRYSTAL CAMERA APERTURE

BACKGROUND OF THE INVENTION

Field of the Invention

The present invention relates in general to the field of information handling system cameras, and more particularly to an information handling system liquid crystal camera aperture.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

One common function of portable information handling systems is to support communication with video conferencing through an integrated or peripheral camera. Video captured by a camera is streamed through a network amongst participants of the video conference and presented by a display at each end node of the video conference. A number of difficulties arise with the use of cameras to support a video conference both in the integrated and peripheral configurations. One difficulty with integrated cameras in particular is that the portable housing size limits the room available for the camera to fit and include a lens that covers an acceptable field of view and a mechanical aperture to secure the camera from unauthorized use and manages light and image inputs to the camera lens and image sensor. Peripheral cameras tend to have a larger housing for the lens and a mechanical aperture, which generally allows capture of higher quality visual images and can include a voice coil motor (VCM) to adjust lens focus. Even with peripheral cameras, space within the camera housing is limited since the cameras are often designed to couple to a flat panel display.

A typical mechanical aperture has an iris design with interlocking leaves that rotate between an open position that exposes the camera lens and a close position that blocks the camera lens. By adjusting the rotational position of a mechanical aperture, the aperture of the camera adjusts to manage the amount of light that enters the camera lens, such as when quantified as an F-number (Fno. or F/ #) values of f/1.8 for a fully open mechanical aperture that adjusts to gradually decrease light with f/2.8, f/4, f5.6, f/8 and f/11. In a fully closed position, the mechanical aperture offers security against unauthorized camera access, such as by a malicious user. However including the mechanical aperture increases the size of the camera to include the moving parts and the actuator. Another difficulty with a mechanical aperture is that a clean room assembly is typically used for manufacture of the aperture in the camera to avoid dust that can impact actuation and distort camera images. As a mechanical aperture is used over time, wear and tear leads to shutter fatigue that can result in failure of the shutter at a position and also introduce contaminants that distort images captured by the camera. Even early into the use of a camera, aperture leaf edges become rounded by friction wear so that light entering the camera scatters thereby producing image ghosting, particularly when rounding happens at an intersection where iris leaves meet.

SUMMARY OF THE INVENTION

Therefore, a need has arisen for a system and method which performs camera aperture light adjustments without a mechanical device.

In accordance with the present invention, a system and method are provided which substantially reduce the disadvantages and problems associated with previous methods and systems for managing a camera aperture and camera security. A camera has a liquid crystal layer with plural areas to selectively block light entering the camera lens to manage the camera aperture with a non-mechanical aperture.

More specifically, an information handling system processes information with a processor and memory that cooperate to execute instructions, such as an operating system and videoconferencing application. A camera interfaced with the processor captures visual images to support the video conference with a lens that directs light to an image sensor and an image signal processor that generates pixel information for light captured by the image sensor. An aperture couples in front of the lens and includes a liquid crystal layer divided into areas, such as by concentric circles of indium tin oxide wire. When no current is applied to the liquid crystal, light is blocked from passing to the lens. When current is applied to an area of the liquid crystal, the areas pass light so that the lens aperture stated as an F-number is managed.

The present invention provides a number of important technical advantages. One example of an important technical advantage is that a camera aperture and security is managed with a non-mechanical aperture that operates without moving parts and reduces the footprint of the camera. A rapid response time is provided with selection of a liquid crystal material that rapidly configures to change light polarization in a binary manner. Aperture F-number settings are provided by configuring plural areas of concentric circles in the aperture and applying current to each area selectively by command of the camera image signal processor.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system camera selectively blocks and unblocks light pass through a lens with a non-mechanical aperture. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
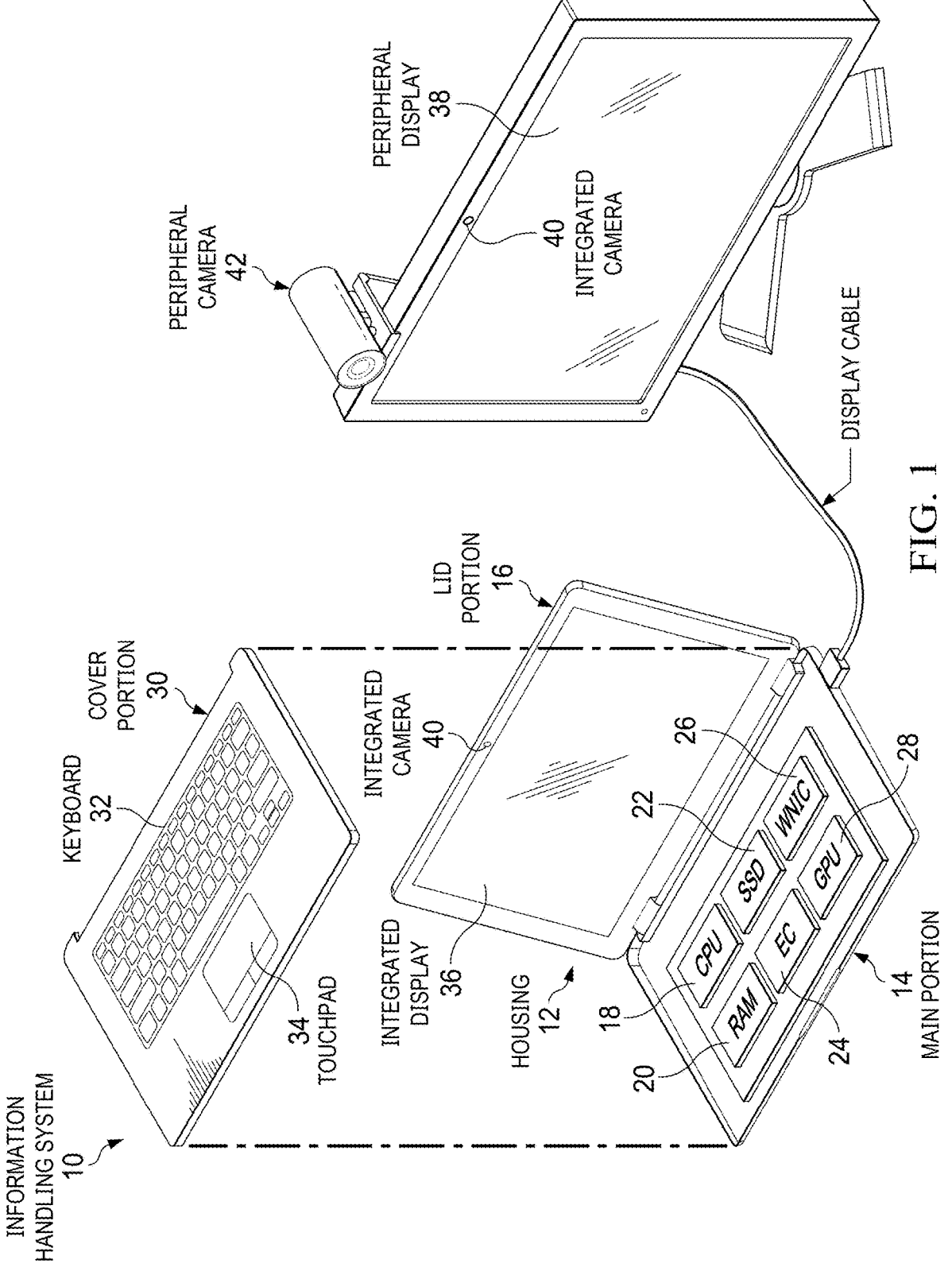
FIG. 1 depicts an upper perspective exploded view of a portable information handling system having a camera with a non-mechanical aperture.

Referring now to FIG. 1, an upper perspective exploded view depicts a portable information handling system 10 having a camera with a non-mechanical aperture. Portable information handling system 10 is built in a portable housing 12 having a main portion 14 rotationally coupled to a lid portion 16 to rotate between open and closed positions. Processing components coupled in main portion 14 cooperate to process information. For instance, a central processing unit (CPU) 18 executes instructions to process information in cooperation with a random access memory (RAM) 20 that stores the instructions and information. A solid state drive (SSD) 22 provides non-transitory storage to store information during system power down, such as an operating system and applications that execute as instructions on CPU 18. An embedded controller 24 manages physical operating conditions in the housing, such as application of power, maintenance of thermal constraints and interactions with input/output (I/O) devices. A wireless network interface controller 26 supports communication with external devices, such as by Ethernet, WIFI and BLUETOOTH. A graphics processing unit (GPU) 28 further processes information to present at a display, such as by defining visual images as pixel values. Visual images are presented at an integrated display 36 coupled to housing lid portion 16 and/or a peripheral display 38 interfaced through a display cable. A housing cover portion 30 couples to housing main portion 14 and supports a keyboard 32 and touchpad 34 to accept end user inputs.

In the example embodiment, portable information handling system 10 is configured to support videoconferencing with integrated peripheral cameras. For example, an integrated camera 40 couples to a housing lid portion 16 to capture visual images of an end user viewing integrated display 36. Peripheral display 38 has an integrated camera 40 coupled at a top side bezel and a peripheral camera 42 coupled to the peripheral display. Integrated cameras 40 have a limited size due to the housing thickness. Peripheral cameras 42 have a greater thickness to support a longer lens structure. In both instances, the size of the camera is reduced by including a non-mechanical aperture that selectively blocks light from passing through the lens. In one example embodiment, a liquid crystal layer is coupled in front of the lens and selectively activated by applying and removing a charge so that the liquid crystals block light and allow light to pass. In one embodiment, when light is completely blocked the liquid crystals reflect incident light so that an end user will see the reflection at the lens as an indication that the lens is blocked, such as by selecting a liquid crystal material with a desired reflection characteristic. The liquid crystal may transition between transparent and opaque states based upon an electric charge, or may change the polarization of passing light as described below. In one example embodiment, the liquid crystal layer acts as a shutter with on and off states that open and close access to the lens. Alternatively, the liquid crystal is divided into areas of concentric circles so that the state of the liquid crystal in the areas defines an aperture of the lens stated as an F-number.

Figure 2:
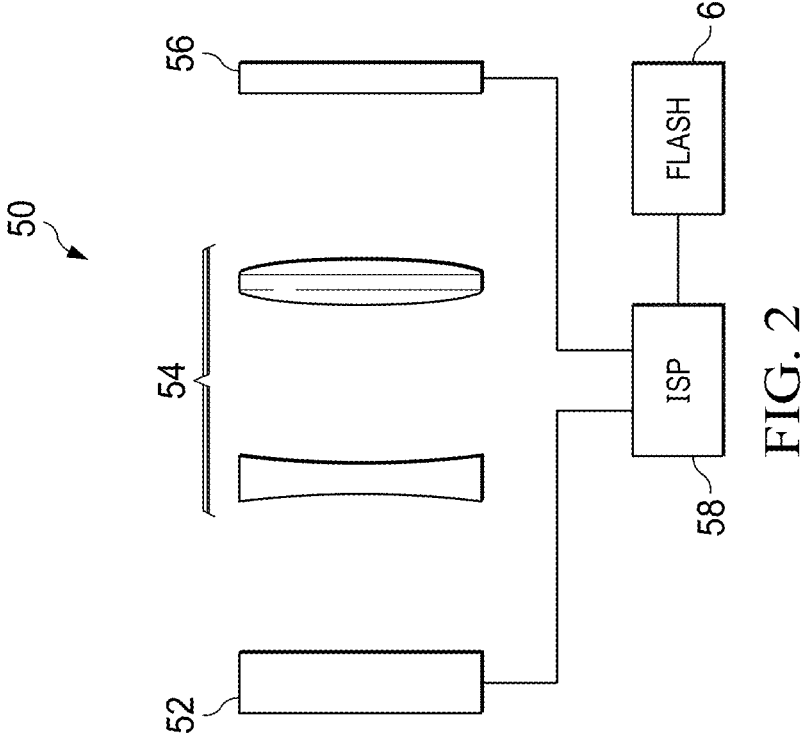
FIG. 2 depicts a side sectional view of a camera configured with a non-mechanical aperture.
Figure 2:
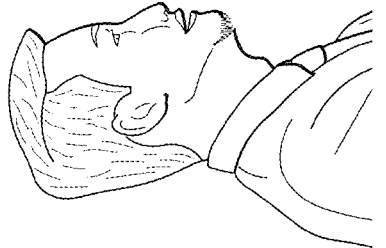

Referring now to FIG. 2, a side sectional view depicts a camera 50 configured with a non-mechanical aperture 52. In the example embodiment, the camera captures an image of an end user from light focused by a lens 54 at an image sensor 56. An image signal processor 58 interfaced with image sensor 56 captures the sensed light to define a visual image as pixel values by executing instructions stored in a flash memory 60 or other non-transitory memory. The non-mechanical aperture 52 selectively blocks and passes light through lens 54 under the management of image signal processor 58 or other processing resource that executes instructions stored in flash 60.

Figure 3:
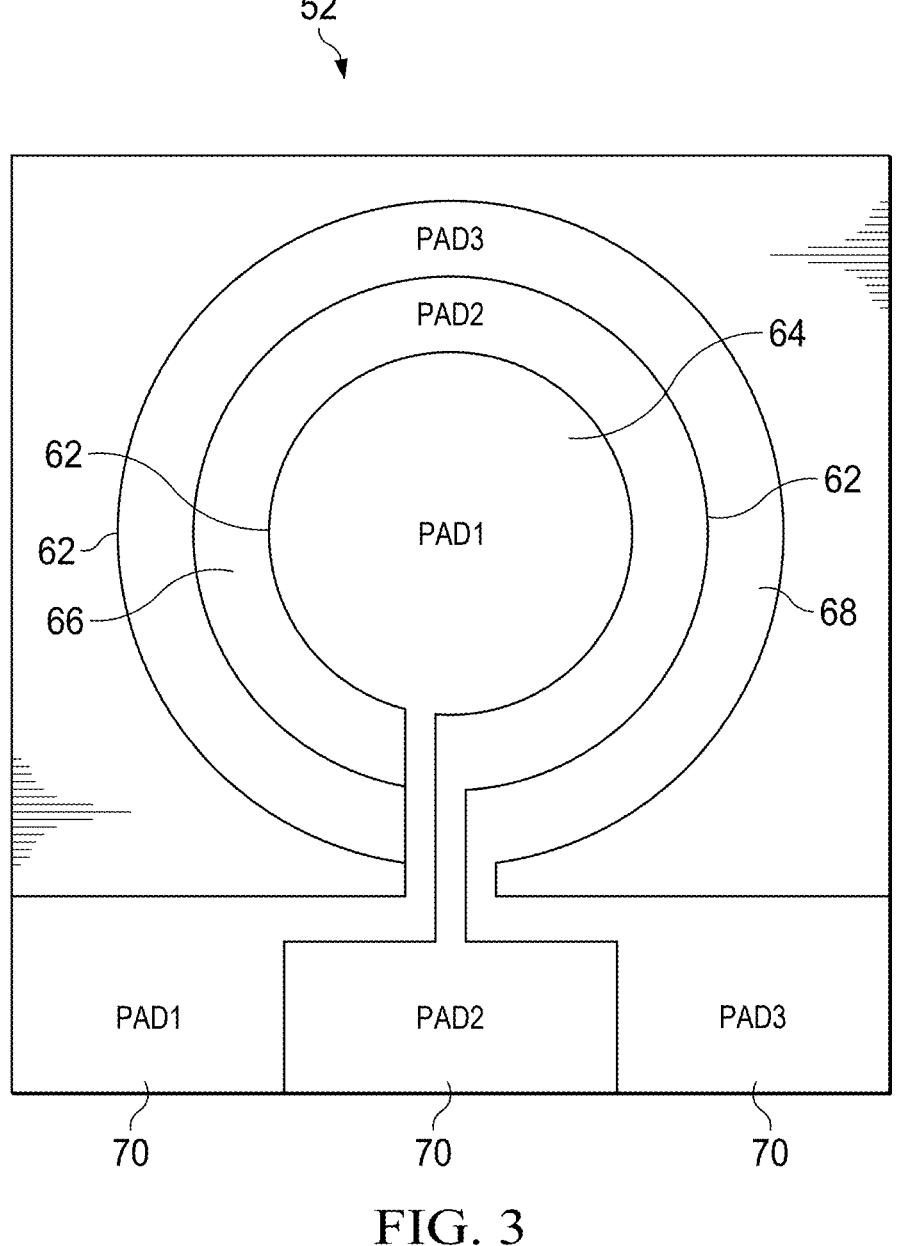
FIG. 3 depicts a front view of an example embodiment of a non-mechanical aperture to manage light entering a lens.

Referring now to FIG. 3, a front view depicts an example embodiment of a non-mechanical aperture to manage light entering a lens. In the example embodiment, a liquid crystal layer is divided into areas by indium tin oxide wire 62 formed as concentric circles centered at a center of the lens and/or image sensor. An inner area 64 when transparent defines a highest F-number, such as range from 4 to 6. A middle area 66 when transparent with inner area 64 defines a middle F-number such as a range from 2 to 3. An outer area 68 when transparent with inner area 64 and middle area 66 has a lowest F-number such as less than 2. When the camera seeks to adjust light that enters the lens, the image signal processor applies a current to the electric field of the desired area through pads 70. To decrease the F-number, a charge is applied to pad 1 as a first incremental decrease, pad 1 and 2 as a second incremental decrease and pad 1, 2 and 3 as a third incremental decrease. In one example embodiment, indium tin oxide wire 62 has a width of 200 micrometers and the outer aperture size is 4 mm with a spacing of 50 micrometers at the wire. Although the example embodiment depicts the non-mechanical aperture in front of the lens, in alternative embodiments the non-mechanical aperture may be located at either side of the lens, including having the polarizers separate from the liquid crystal layer and having one of the polarizes at a front of the lens and the other at the rear of the lens. In such an embodiment, the liquid crystal layer may be located at a front or rear of the lens with one of the polarizers.

Figure 4:
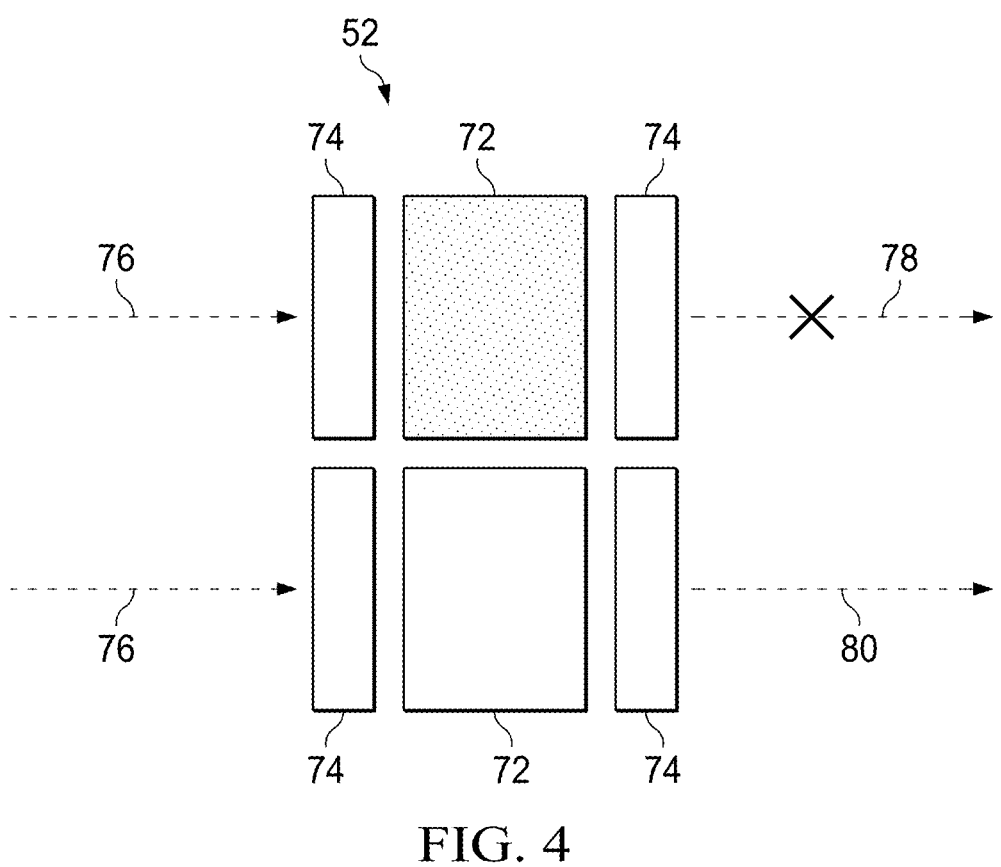
FIG. 4 depicts a schematic diagram of an example of light selectively passing through and getting blocked by the aperture.

Referring now to FIG. 4, a schematic diagram depicts an example of light selectively passing through and getting blocked by aperture 52. Incoming light 76 passes through a first polarizer 74 to polarize to a first orientation. The light then passes through a liquid crystal layer 72 and then out a second polarizer 74 having a polarization orthogonal the first polarizer. When no charge is applied to liquid crystal layer 72, the light maintains its polarization orientation so that the orthogonal orientation of the second polarizer blocks light 78. When a charge is applied to liquid crystal layer 72, the polarization orientation of light 76 is adjusted 90 degrees so that the polarization matches the orthogonal orientation of the second polarizer and the light 80 passes through the aperture to the lens.

Figure 5:
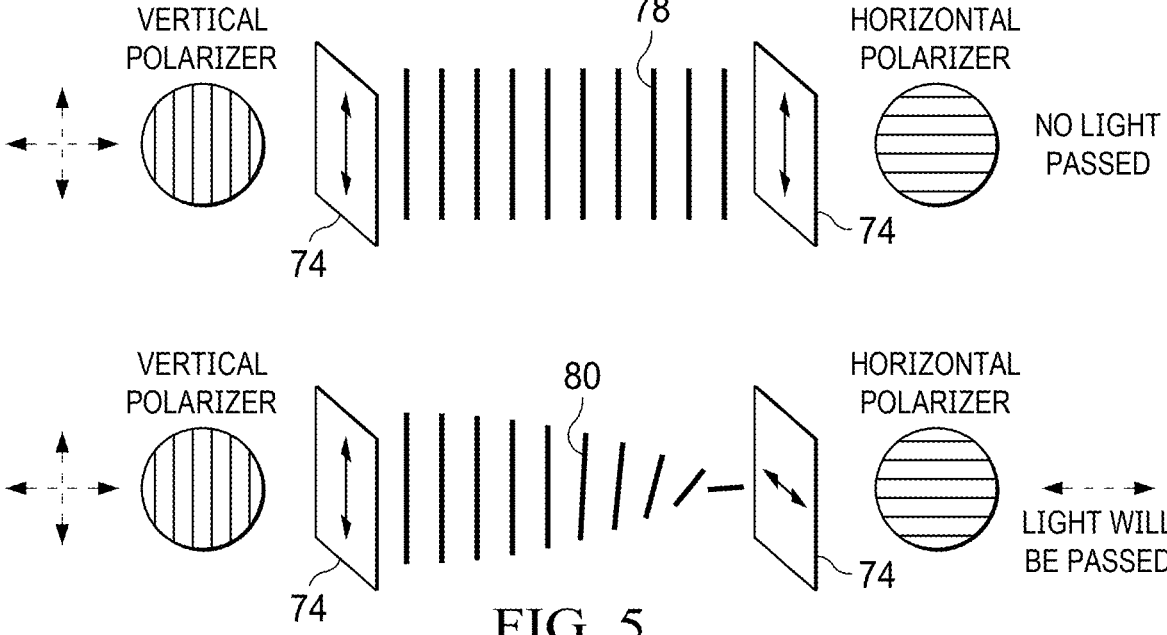
FIG. 5 depicts a schematic diagram of an example of application of polarization through liquid crystals to manage light passage through the aperture.

Referring now to FIG. 5, a schematic diagram depicts an example of application of polarization through liquid crystals to manage light passage through the aperture. In the example embodiment, polarizers 74 couple to each side of a liquid crystal layer 72. Polarizers 74 have orthogonal polarization so that light will not pass through the aperture when liquid crystal layer 72 does not alter the polarization of light. Light 78 in the upper example maintains a vertical polarization set by the first polarizer as it passes through liquid crystal layer 72 so that the second polarizer with horizonal orientation blocks the light. Light 80 in the lower example has a vertical polarization when it enters the liquid crystal layer, and then rotates to a horizonal polarization so that the light passes to the lens. In an alternative example, polarizers 74 may have the same orientation so that when no charge is applied to the liquid crystal the light passes through to the lens. In such an embodiment, application of a charge rotates the polarization 90 degrees to block the light at the second polarizer. The depicted example, by blocking light when no charge is applied to the liquid crystal, provides a safety shutter to block the use of the camera.

Figure 6A:
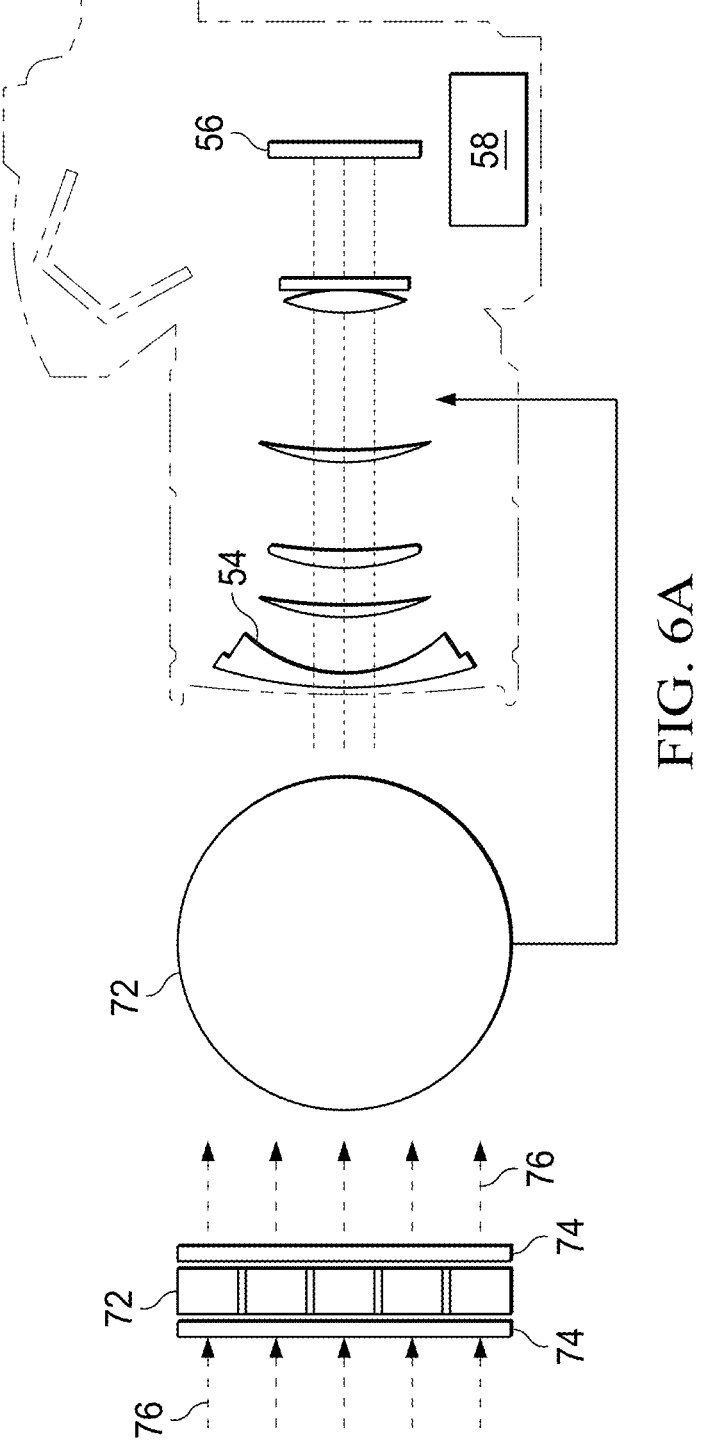
FIGS. 6A, 6B and 6C depict side schematic diagrams of examples of settings for the liquid crystal layer of the aperture to adjust the lens aperture stated as an F-number.
Figure 6B:
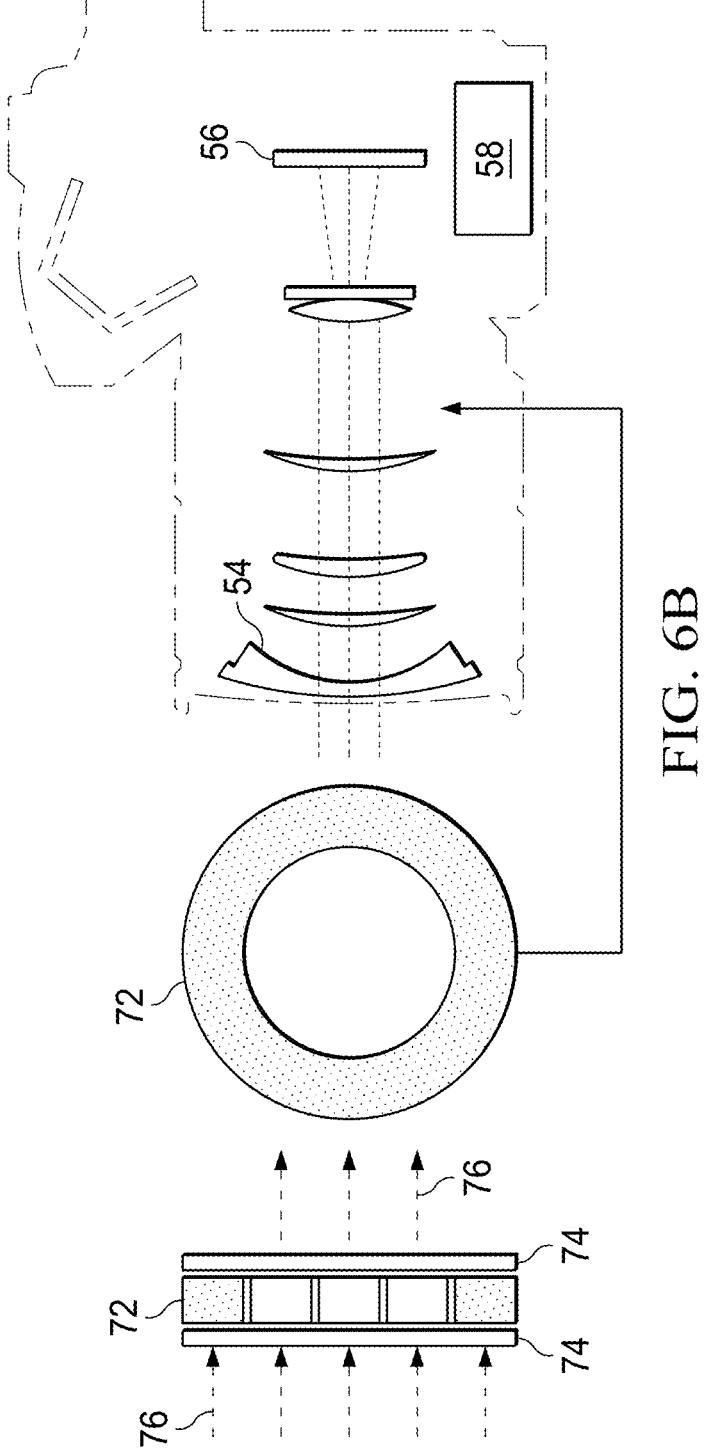
Figure 6C:
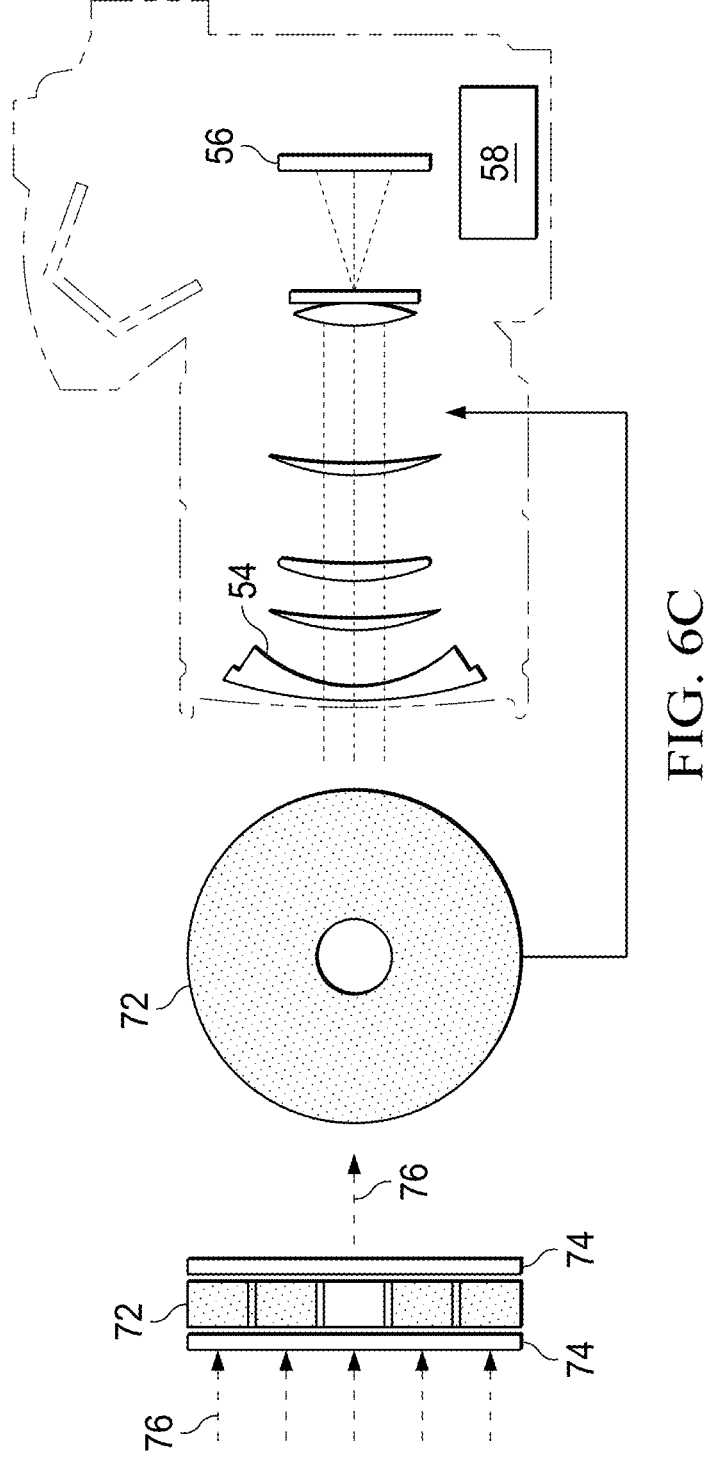

Referring now to FIGS. 6A, 6B and 6C, side schematic diagrams depict examples of settings for the liquid crystal layer of the aperture to adjust the lens aperture stated as an F-number. FIG. 6A depicts aperture 52 set to a low F-number with the areas each having a charge applied so that the aperture is maximum open. Light 76 enters through a first polarizer 74 and has the polarization rotated through all areas so that the light passes through all areas into lens 54 to focus at image sensor 56 for capture of a visual image by image signal processor 58. FIG. 6B depicts aperture 52 with charge applied only to the two inner areas of the liquid crystal layer 72 so that light aligned with the outer area is blocked with orthogonal polarization orientation to the second polarizer 74. FIG. 6C depicts aperture 52 with charge applied only to the inner area of the liquid crystal layer 72 so that only the center circle area passes light to the camera lens. When all charge is removed, liquid crystal layer 72 blocks all light into the lens, thereby acting as a security shutter.

Although the present invention has been described in detail, it should be understood that various changes, substitutions and alterations can be made hereto without departing from the spirit and scope of the invention as defined by the appended claims.

What is claimed is:

1. An information handling system comprising:
a housing;
a processor coupled in the housing and operable to execute instructions to process information;
a memory coupled in the housing and operable to store the instructions and information;
a wireless network interface controller operable to communicate the information through a network;
a persistent storage operable to store the instructions and information;
a camera interfaced with the processor and operable to capture visual images for communication through the network, the camera having an image signal processor, an image sensor and a lens, the lens aligned to direct light at the image sensor, the image signal processor capture a visual image from the light detected by the image sensor;
an aperture interfaced with the image signal processor and aligned with the lens, the aperture having a liquid crystal layer with plural areas, each of the plural areas associated with an F-number of the lens, the aperture having a first polarizer coupled in front of the lens, a second polarizer coupled at a rear of the lens and the liquid crystal layer between the first polarizer and the second polarizer; and
a non-transient memory storing instructions that when executed on the image signal processor selectively apply an electric field to each of the plural areas to have a predetermined F-number.

2. The information handling system of claim 1 further comprising:
plural concentric circles of indium tin oxide wire in the liquid crystal layer, each circle defining one of the plural areas; and
instructions that when executed on the image signal processor incrementally apply the electrical field from the inner most concentric circle to the outer most concentric circle as the predetermined F-number decreases.

3. The information handling system of claim 2 wherein a neutral state of the liquid crystal layer without any charge applied blocks light from passing through the lens.

4. The information handling system of claim 2 wherein the liquid crystal layer couples at the rear side of the lens.

5. The information handling system of claim 4 wherein the first and second polarizers have the same orientations and the liquid crystal layer rotates light polarization when an electric field is applied to block light passage to the lens.

6. The information handling system of claim 4 wherein the first and second polarizers have orthogonal orientations and the liquid crystal layer rotates light polarization when an electric field is applied to unblock light passage to the lens.

7. The information handling system of claim 6 further comprising plural pads defined in the liquid crystal layer, each pad interfaced with a one of the concentric circles to selectively apply the electric field.

8. The information handling system of claim 2 wherein the camera integrates into the housing.

9. The information handling system of claim 2 wherein the camera couples into a camera housing separate from the housing.

10. A method for capturing visual images comprising:
aligning a lens to focus light on an image sensor;
coupling a first polarizer at a front side of the lens;
coupling a second polarizer at a rear side of the lens;
coupling a liquid crystal between the first polarizer and the second polarizer; and
adjusting charge at the liquid crystal layer to adjust the polarization of light passed through the first polarizer to selectively block and pass light through the second polarizer;
selectively applying charge to an aperture liquid crystal layer to pass light through the lens with a selected F-number; and
capturing a visual image with an image signal processor coupled to the image sensor.

11. The method of claim 10 further comprising:
separating the liquid crystal into plural areas of concentric circles with indium tin oxide wire; and
selectively applying charge to unblock the plural areas of concentric circles from an inner area to an outer area to decrease the F-number.

12. The method of claim 11 further comprising:
coupling the liquid crystal at the rear side of the lens.

13. The method of claim 12 wherein the first and second polarizers have the same orientations and the liquid crystal layer rotates light polarization when an electric field is applied to block light passage to the lens.

14. The method of claim 12 wherein the first and second polarizers have orthogonal orientations and the liquid crystal layer rotates light polarization when an electric field is applied to unblock light passage to the lens.

15. The method of claim 12 further comprising:
defining plural pads in the liquid crystal layer, each pad interfaced with a concentric circle; and
interfacing each pad with an image signal processor to control the F-number by applying current to the pads.

16. A camera comprising:
an image signal processor;
an image sensor;
a lens aligned to direct light at the image sensor, the image signal processor capturing a visual image from the light detected by the image sensor;
an aperture interfaced with the image signal processor and aligned with the lens, the aperture having a first polarizer at a front side of the lens, a second polarizer at a rear side of the lens and a liquid crystal layer with plural areas between the first polarizer and the second polarizer, each of the plural areas associated with an F-number of the lens; and
a non-transient memory storing instructions that when executed on the image signal processor selectively apply an electric field to each of the plural areas to have a predetermined F-number.

17. The camera of claim 16 further comprising:
plural concentric circles of indium tin oxide wire in the liquid crystal layer, each circle defining one of the plural areas; and
instructions that when executed on the image signal processor incrementally apply the electrical field from the inner most concentric circle to the outer most concentric circle as the predetermined F-number decreases.

18. The camera of claim 17 wherein the liquid crystal layer couples at the rear side of the lens.

19. The camera of claim 18 wherein the first and second polarizers have orthogonal orientations and the liquid crystal layer rotates light polarization when an electric field is applied to unblock light passage to the lens.

20. The camera of claim 19 further comprising plural pads defined in the liquid crystal layer, each pad interfaced with a one of the concentric circles to selectively apply the electric field.

* * * * *